Dec. 17, 1957 C. W. SAUCERMAN 2,816,796
INSECT DEFLECTOR FOR VEHICLE WINDSHIELDS
Filed Feb. 3, 1955
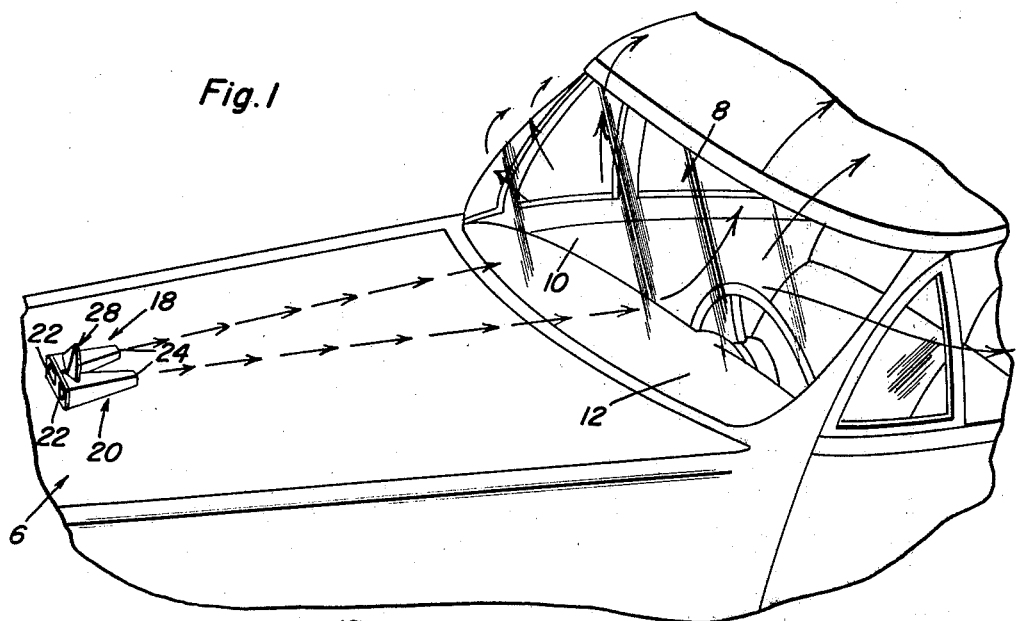
Fig. 1
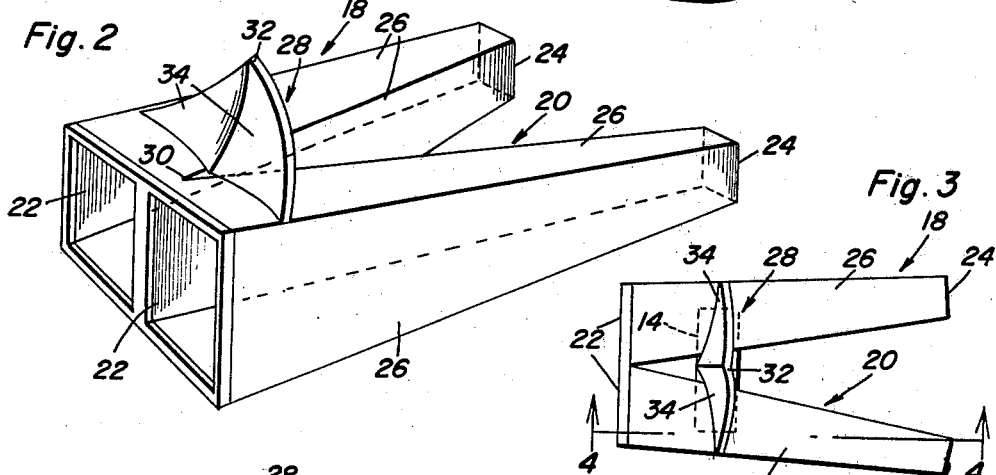
Fig. 2
Fig. 3
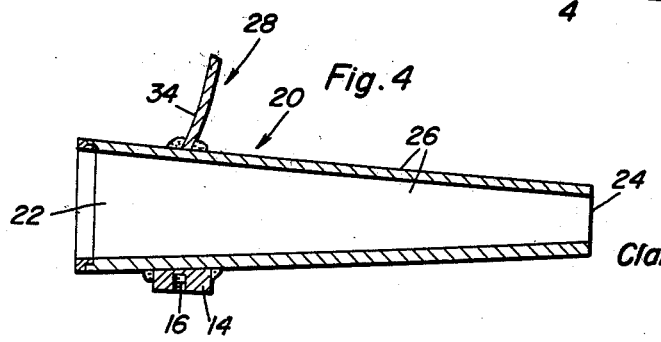
Fig. 4
Clarence W. Saucerman
INVENTOR.
BY

United States Patent Office 2,816,796
Patented Dec. 17, 1957

2,816,796
INSECT DEFLECTOR FOR VEHICLE WINDSHIELDS

Clarence W. Saucerman, Salem, Wis.

Application February 3, 1955, Serial No. 485,929

3 Claims. (Cl. 296—91)

The present invention relates to automobile accessories, generally described, and has reference in particular to a device which has become to be known as a deflector for bugs and insects, that is, a device which is so constructed and mounted on the hood in front of the windshield that it effectually diverts insects in a generally well-known manner.

Insect deflectors commonly in use take the form of an upstanding shield having wing-like components which are angled and otherwise fashioned to divert insects in the path of movement of the automobile, the idea being to cause the insects to keep from landing on the windshield and perhaps obscuring the vision of the driver. The present disclosure has to do with a structurally distinct concept which is destined, it is believed, to minimize splattering of insects on the exterior windshield surface. To this end the principle of the invention calls for the provision of a unique arrangement of one or more funnels which function to forcibly tunnel the air therethrough in the direction of movement of the car or automobile with the result that the insects carom and glance off of the windshield at the lower left and right corner portions and, for the most part, fail to land and are thus effectually disposed of.

In carrying out a preferred embodiment of the invention the funnel means is preferably characterized by a pair of coplanar forwardly converging open-ended funnels or ducts whose rear discharge ends are directed toward the lower corner portions of the windshield thus to bring about the desired non-splattering results.

More particularly, the funnels are of truncated pyramidal form and have their larger ends directed toward the leading end of the hood and their smaller ends toward the windshield. The larger ends converge and the smaller discharge ends diverge. The principal exterior surfaces of the funnels also serve as deflectors or diverters whereby to insure over-all efficient and satisfactory results.

Then, too, novelty is predicated on the pair of coplanar truncated pyramidal funnels and the combination therewith of an upstanding added deflector shield which is located at the crotch portion of the space between the respective funnels and which therefore aids in the scattering of insects such as might otherwise strike the windshield in such numbers and force as to sooner or later obscure the driver's vision.

Other objects, features and advantages will become more readily apparent from the following description and the accompanying sheet of illustrative drawings.

In the drawings, wherein like numerals are employed to designate like parts throughout the views:

Figure 1 is a fragmentary perspective view showing a portion of an automobile and the improved insect collector and deflector constructed in accordance with the invention;

Figure 2 is a perspective view of the deflector by itself;

Figure 3 is a top plan view of the same on a smaller scale; and

Figure 4 is a section on the line 4—4 of Figure 3 looking in the direction of the arrows.

Referring now to the drawings with the aid of reference numerals, the diagrammatic showing in Fig. 1 is sufficient, it is believed, to show the general construction and useful performance of the invention. The hood or bonnet of the automobile is denoted by the numeral 6 and the windshield by the numeral 8. The left and right hand corner portions of the windshield are denoted at 10 and 12. It is, of course, difficult to trace precisely the path of travel of the temporarily trapped and projected insect-laden air currents. The arrows utilized will give a general idea of how experience has shown that the insects, for the most part, are caused to carom and glance off of the windshield. Sometimes they ride up and over and sometimes to the left or right. In most instances the air currents strike the lower portion of the windshield just above the cowl. In fact the very purpose of the invention is to confine and direct the air and insects to these easy-to-dispose-of areas of the windshield. As is usual with insect and so-called bug deflectors, the device is mounted centrally atop the leading end of the hood. Any appropriate attaching bar or member such as the base 14 in Fig. 4 will do. This will be provided with screw-threaded sockets 16 to accommodate screws or other fasteners (not shown). As already mentioned, the preferred embodiment of the invention is that which includes a pair of air ducts which are here conveniently treated as air trapping funnels 18 and 20. The funnels are of duplicate construction and are preferably joined together at their forward or leading ends. These are described as the larger ends and also as the intake ends 22. The smaller discharge ends are denoted at 24. Thus, we have a pair of coplanar funnels which are in forwardly convergent interconnected relationship and consequently with the rear ends spaced apart or in divergent relationship. In practice, these funnels are from six or eight inches in length and of any suitable cross-sectional dimension. They are preferably truncated pyramidal in form so as to provide flat exterior surfaces 26. It is to be explained in this connection that cones of circular cross-section were tried but these do not provide the desired deflecting surfaces. That is to say, when the insects are striking curved or convex surfaces they sometimes are not effectually scattered. These flat surfaces, however, are in themselves deflectors as is obvious. The aforementioned shield 28 is of general triangular form and the base portion spreads or stretches across the crotch 30 and the apex is disposed at a suitable vertical height as at 32. The V-shaped complements or components 34 are preferably dished and in slightly convergent relationship so that we have what is in effect not only the facilities now afforded on present day types of insect deflectors but the added facilities of the effective air tunnelling funnels. Therefore, there are no flexible or moving parts and the structure is a one-piece entity and is stable, useful and may be finished in various commercial plastics and colors and thus made what is tantamount to a hood ornament.

This invention will solve the problem of objectionable splattering of bugs and insects on windshield surfaces. It is simple, practical, neat in appearance and otherwise intended to fulfill the requirements of manufacturers and needs of motorists.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. For use with an automotive vehicle having a windshield and a bonnet extending forwardly of the windshield, the bonnet lying in a plane generally horizontal and the windshield lying in an inclined but generally vertical plane and projecting upwardly above the level of the bonnet, apparatus for momentarily trapping, and promptly diverting and disposing of insects in the path of forward movement of said automotive vehicle, said apparatus comprising: a unitary structure attached to the upper and exterior surface of the bonnet at the forward end thereof, remote from the windshield, said structure being located substantially midway between the opposite side edges of the bonnet and being positioned so that the entire structure is confined forwardly of the front-to-rear mid point of the bonnet, said structure including complemental, generally horizontally disposed elongated air collecting and concentrating funnels, the intake ends of which are the larger ends, the intake ends being faced in the direction of travel and the discharge ends being directed toward the windshield, the funnels diverging one relative to the other from their intake ends toward their discharge ends, whereby the intercepted insects are concentrated and forcibly blown by the funneled air currents clear of the path of travel of said windshield.

2. For use with an automotive vehicle having a windshield and a bonnet extending forwardly of the windshield, the bonnet lying in a plane generally horizontal and the windshield lying in an inclined but generally vertical plane and projecting upwardly above the level of the bonnet, apparatus for momentarily trapping, and promptly diverting and disposing of insects in the path of forward movement of said automotive vehicle, said apparatus comprising: a unitary structure attached to the upper and exterior surface of the bonnet at the forward end thereof, remote from the windshield, said structure being located substantially midway between the opposite side edges of the bonnet and being positioned so that the entire structure is confined forwardly of the front-to-rear mid point of the bonnet, said structure including complemental, generally horizontally disposed elongated air collecting and concentrating funnels, the intake ends of which are the larger ends, the intake ends being faced in the direction of travel and the discharge ends being directed toward the windshield, the funnels diverging one relative to the other from their intake ends toward their discharge ends, said funnels being of generally truncated pyramidal shape and being attached to each other at the intake ends but separate and spaced from each other at the discharge ends whereby the intercepted insects are concentrated and forcibly blown by the funneled air currents clear of the path of travel of said windshield.

3. Apparatus as set forth in claim 2 wherein a diverter shield is attached to and projects generally vertically upwardly from the funnels, said shield spanning the funnels adjacent the intake ends thereof.

References Cited in the file of this patent

UNITED STATES PATENTS

| | | |
|---|---|---|
| 940,270 | Patrick | Nov. 16, 1909 |
| 1,518,319 | Freeman et al. | Dec. 9, 1924 |
| 1,865,675 | Cavanaugh | July 5, 1932 |
| 2,045,826 | Benolken | June 30, 1936 |
| 2,133,927 | Riel | Oct. 18, 1938 |
| 2,223,378 | Martin | Dec. 3, 1940 |
| 2,601,401 | Kish | June 24, 1952 |
| 2,727,782 | Reed | Dec. 20, 1955 |
| 2,754,147 | Dell | July 10, 1956 |